(12) United States Patent
Ebbrecht et al.

(10) Patent No.: US 8,633,291 B2
(45) Date of Patent: Jan. 21, 2014

(54) REACTIVE LIQUID CERAMIC BINDER RESIN

(75) Inventors: Thomas Ebbrecht, Wetter (DE); Tadeusz von Rymon Lipinski, Bonn (DE); Stefan Silber, Krefeld (DE); Bernd Weyershausen, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 1048 days.

(21) Appl. No.: 11/789,982

(22) Filed: Apr. 26, 2007

(65) Prior Publication Data

US 2008/0034794 A1 Feb. 14, 2008

(30) Foreign Application Priority Data

May 5, 2006 (DE) .......................... 10 2006 020 967

(51) Int. Cl.
*C08G 77/00* (2006.01)

(52) U.S. Cl.
USPC .......................................................... 528/10

(58) Field of Classification Search
USPC .......................................................... 528/10
See application file for complete search history.

(56) References Cited

U.S. PATENT DOCUMENTS

| | | | | |
|---|---|---|---|---|
| 3,719,630 A * | 3/1973 | Antonen | ........................ | 524/780 |
| 4,638,029 A * | 1/1987 | Meschke et al. | .............. | 524/430 |
| 5,319,121 A | 6/1994 | Blum | | |
| 5,348,760 A * | 9/1994 | Parker et al. | ........................ | 427/9 |
| 5,741,842 A * | 4/1998 | Huggins et al. | ................ | 524/500 |
| 6,221,498 B1 * | 4/2001 | Takahama et al. | ............ | 428/447 |
| 2004/0152828 A1 * | 8/2004 | Brandt et al. | ................ | 524/588 |
| 2005/0218565 A1 * | 10/2005 | DiChiara | ..................... | 264/621 |

FOREIGN PATENT DOCUMENTS

| | | |
|---|---|---|
| DE | 2106128 | 8/1971 |
| DE | 3312911 A1 | 10/1984 |
| EP | 0124748 A1 | 11/1984 |
| GB | 1279794 | 6/1972 |
| JP | 2004107140 A | 4/2004 |
| WO | WO 93/01146 | 1/1993 |

OTHER PUBLICATIONS

Mishra et al, "Influence of behaviour of alumina slurry on quality of alumina powder prepared by jet wheel impact atomization", Powder Technology 196 (2009) 272-277.*
European Search Report dated Oct. 22, 2010.

\* cited by examiner

*Primary Examiner* — Kuo-Liang Peng
(74) *Attorney, Agent, or Firm* — Scully, Scott, Murphy & Presser, P.C.

(57) ABSTRACT

A reactive liquid ceramic binder suitable for the production of ceramic products from ceramic powders is provided. The reactive liquid ceramic binder contains organo-modified siloxane compounds, wherein the liquid organo-modified siloxane compounds contain organoalkoxysiloxane units according to general formula (I)

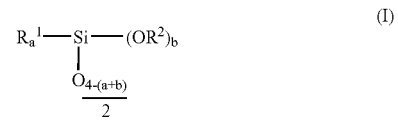

wherein
$R^1$=alkyl radical and/or aryl radical,
$R^2$=H and/or alkyl radical with 1 to 4 carbon atoms,
$a \geq 0$ and $\leq 2$, and
$b < 0$ and $\leq 3$,
with the proviso that $a+b \geq 1$ and $\leq 4$.

7 Claims, 1 Drawing Sheet

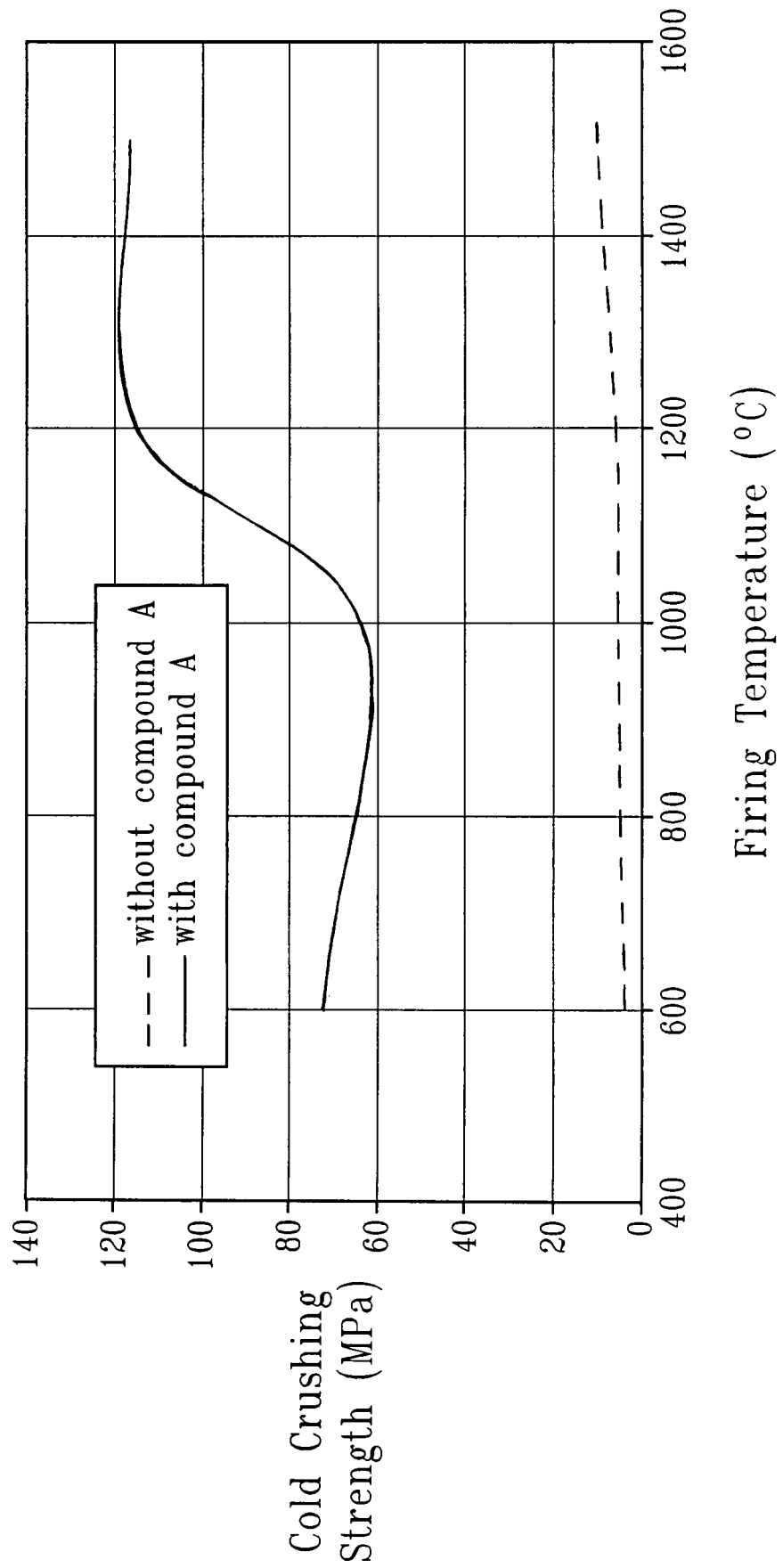

REACTIVE LIQUID CERAMIC BINDER RESIN

FIELD OF THE INVENTION

The present invention relates to a reactive liquid binder, which is suitable for the binding of ceramic particles for the production of ceramic products, in particular refractory ceramic products, from ceramic powders. The invention further relates to the use of the binder and a process for the production of the aforesaid ceramic products, and also ceramic products as such, wherein refractory ceramic products are particularly preferred according to the invention.

BACKGROUND OF THE INVENTION

Refractory ceramic products, also referred to below as "refractories", are used for protection against high temperatures in many industrial plants. The most important refractory material types are:
- shaped dense products, with a porosity ≤45 vol. %, such as bricks and building components,
- shaped thermally insulating products, with a porosity ≥45 vol. %, such as lightweight refractory bricks,
- unshaped refractory products, such as refractory concretes, ramming mixes, spraying mixes and the like.

Conventional refractory products are produced from powder raw materials. The grain size of the powder lies in a relatively broad range, between a few micrometers up to several millimeters. In isolated cases, raw materials with a particle size >10 mm are also used. Correspondingly, the powders are described as coarse-grained, medium-grained, fine-grained and ultra fine-grained particle fraction.

From the state of the art, solid, branched or cross-linked, high molecular weight organo-modified siloxanes or solid phenylmethylpolysiloxanes are known. WO 93/01146 relates to a binder for thermoplastic molding mixes containing at least one thermoplastic silicone resin, with a softening point between 30° C. and 200° C., for the production of molded parts from ceramic or metal from the corresponding ceramic or metal powders. Such thermoplastic molding mixes are used inter alia in processes such as ceramic injection moulding, extrusion or hot pressing, wherein temperature-dependent flow behavior is necessary. Such silicone resins are according to WO 93/01146 preferably used without catalysts, so that further cross-linking and curing during the molding process does not occur.

The use of these aforesaid solid siloxane compounds as ceramic binders has the disadvantage that very homogenous mixtures with ceramic materials are inadequately produced or they are not produced at all. Moreover, with the use of such binders, a sufficiently high green strength of the ceramic product molded from ceramic particles cannot be obtained without a heat treatment at higher temperatures. A further disadvantage of prior art binders is that very high firing temperatures, usually over 1000° C., are needed in order to obtain refractory ceramic products with adequate mechanical properties such as cold crushing strength. Moreover, high pressures and long firing times are needed, which is associated with high energy consumption.

Furthermore, WO 93/01146 relates to a binder for thermoplastic molding mixes, wherein the molding mixes are exclusively processed plastically above the softening point of the silicone resin, and introduced under pressure into molds whose temperature lies below the softening point of the silicone resin. According to the teaching of WO 93/01146, molded, ceramic products with adequate green strength cannot be produced by non-plastic processing, for example uniaxially or isostatically pressed, by slip casting, by ramming, or spraying, in particular at temperatures below the softening point of the silicone resin or the like. In addition, unshaped ceramic products, in particular refractory materials, cannot be produced with the binder and process described in WO 93/01146.

In view of the above, there is a need for a reactive liquid binder that overcomes the drawbacks of prior art binders discussed above, which binder can be used for the binding of ceramic particles for the production of ceramic products.

SUMMARY OF THE INVENTION

Surprisingly, it has now been found that ceramic products, in particular refractory ceramic products which have unexpectedly high cold crushing strength, can be obtained at low treatment temperatures.

The aforementioned objective is achieved in the present invention by means of a reactive liquid ceramic binder, which is suitable for the production of ceramic products, in particular refractory ceramic products, from ceramic powders, wherein the reactive liquid ceramic binder contains at least one organo-modified siloxane compound, wherein the at least one organo-modified siloxane compound contains organoalkoxysiloxane units according to general formula (I)

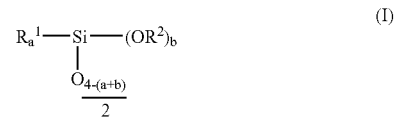

$$\frac{R^1_a - Si - (OR^2)_b}{2} \quad | \quad O_{4-(a+b)}$$
(I)

wherein
$R^1$=alkyl radical and/or aryl radical,
$R^2$=H and/or alkyl radical with 1 to 4 carbon atoms,
$a \geq 0$ and $\leq 2$, and
$b > 0$ and $\leq 3$,
with the proviso that $a+b \geq 1$ and $\leq 4$.

The invention further relates to the use of the inventive binder described above as well as a process for the production of ceramic products, and also ceramic products as such, wherein refractory ceramic products are particularly preferred according to the invention.

BRIEF DESCRIPTION OF THE DRAWINGS

FIG. 1, the sole FIGURE present in the instant application, shows the effects of the firing temperature on the cold crushing strength of ceramic samples with and without the addition of compound A which is a compound within the scope of formula (I).

DETAILED DESCRIPTION OF THE INVENTION

The present invention, which provides a reactive liquid ceramic binder, which is suitable for the production of ceramic products, in particular refractory ceramic products, from ceramic powders, will now be described in greater detail.

As stated above, the present invention provides a reactive liquid ceramic binder that contains at least one organo-modified siloxane compound, wherein the at least one organo-modified siloxane compound contains organoalkoxysiloxane units according to general formula (I)

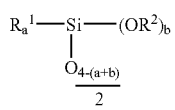

wherein
$R^1$ = alkyl radical and/or aryl radical,
$R^2$ = H and/or alkyl radical with 1 to 4 carbon atoms,
$a \geq 0$ and $\leq 2$, and
$b > 0$ and $\leq 3$,
with the proviso that $a+b \geq 1$ and $\leq 4$.

Formula (I) is an average formula of the organoalkoxysiloxane units of the liquid, organo-modified siloxane compound.

The proportion of H for $R^2$ can be $\geq 0\%$ and $\leq 10\%$, preferably $\geq 0\%$ and $\leq 5\%$, particularly preferably $\geq 0\%$ and $\leq 1\%$, and especially preferably 0%.

The term "ceramic product" includes inter alia ceramic mixes, dimensionally stable ceramic objects and refractory ceramic products.

The inventive reactive liquid ceramic binder preferably contains at least one liquid organo-modified siloxane compound, wherein the liquid, organo-modified siloxane compound contains organoalkoxysiloxane units according to the general formula (I).

The term "liquid" as used in the present invention has the meaning that the corresponding substance, in particular the liquid, organo-modified siloxane compound or the corresponding mixture is liquid at room temperature, i.e. 25° C.

Preferably, the substituents $R^1$ and/or $R^2$ of the organoalkoxysiloxanes of the liquid, organo-modified siloxane compound/s are as defined below:
$R^1$ = phenyl and/or $C_1$-$C_{16}$ alkyl radical, preferably $R^1$ = $C_1$-$C_{12}$ alkyl radical, more preferably $R^1$ = $C_1$-$C_8$ alkyl radical, particularly preferably $R^1$ = $C_1$-$C_4$ alkyl radical, wherein most preferably $R^1$ = methyl and/or ethyl; and/or
$R^2$ = H, methyl, ethyl, propyl, isopropyl, butyl or tert-butyl, where methyl and/or ethyl are most preferred.

Furthermore, it is preferable according to the invention that $a=0.5$ to $1.8$, preferably $a=0.7$ to $1.7$, and more preferably $a=1.0$ to $1.5$, with the proviso that $a+b \leq 4$ and preferably $a+b \leq 3$.

In addition, it is also specified according to the invention that $b=0.1$ to $2.5$, preferably $b=0.2$ to $2.3$, still more preferably $b=>0.3$ to $2.0$ and particularly preferably $b=>0.3$ to $1.2$, with the proviso that $a+b \leq 4$ and preferably $a+b \leq 3$.

The reactive liquid organo-modified siloxane compounds according to the invention can have a molecular weight from 120 to 100,000, preferably 250 to 80,000, preferably 500 to 60,000, more preferably 750 to 50,000 and particularly preferably 1,000 to 30,000.

Moreover, the reactive liquid ceramic binder according to the invention can contain a solvent selected from organic solvents, preferably liquid hydrocarbons, in particular with a boiling point between 40° C. to 100° C., alcohol and/or acetone. Through the addition of solvents, for example, the miscibility with ceramic powders can be improved.

In some embodiments of the present invention, it is preferable that the reactive liquid ceramic binder, in particular a ceramic binder containing liquid organo-modified siloxane compounds, is used in a mixture with water, preferably as an aqueous emulsion. Through the use of an aqueous emulsion in combination with the ceramic powder, for example, a material that can be cast or sprayed at room temperature can be produced.

For the improvement of the properties for example with regard to processability, handling, drying process, firing process, strength, corrosion resistance and/or oxidation resistance of the ceramic mix and/or ceramic product, at least one additive can be added to the ceramic binder, wherein this additive is different from the organo-modified siloxane compound(s) based on the formula (I) and is selected from an inorganic binder, an inorganic salt of sulfuric acid, an inorganic salt of hydrochloric acid, an inorganic salt of phosphoric acid, magnesium chloride, magnesium sulfate, monoaluminum phosphate, alkali metal phosphate, alkali metal silicate, waterglass, an organic binder resin, cellulose derivative, polyvinyl alcohol, water, organic solvents, mold release agents, stabilizers, organic pigments, inorganic pigments, non-oxide substances, preferably carbon, metal powders, metal fibers, ceramic fibers, glass fibers, natural fibers, plastic fibers, metal oxides, borides, carbides, nitrides, oxynitrides, oxycarbides, silicides, polymers, catalyst and/or carbon fibers. The addition of very reactive nanoscale, oxide and/or non-oxide powders can be preferable in some embodiments and the addition of nano-aluminum oxide and/or of precursors thereof can be particularly preferable in yet other embodiments.

Further additives which are usable according to the invention, in particular for the improvement of the processability, handling, green density, green strength etc., include setting retardants, setting accelerators, pressing agents, lubricants, set-up agents, antifoam agents, liquefiers, sintering agents and the like.

Particularly preferred is the use of liquid, organo-modified siloxane compounds of the binder according to the invention in combination with other additives, such as organic and/or inorganic binders, water, organic solvents, functional additives such as carbon, borides, metal powders, carbides, silicides, oxides and the like.

Likewise, the use of the ceramic binder in combination with hydraulic binders, such as hydratable aluminum oxide, calcium aluminate cement, Portland cement, or gypsum optionally with water in variable amounts, can be advantageous.

In some embodiments, nanoscale metal oxides, preferably nanoscale aluminum oxide, can be added to the ceramic binder, which can result in improved cold crushing strength of ceramic products.

Furthermore, it has surprisingly been found that the use of the inventive reactive liquid ceramic binder in combination with a ceramic powder leads to stable, in particular refractory, ceramic products with low firing temperatures.

In general and in the description of the present invention, refractory ceramic products are also described as refractory ceramic materials or refractories.

A further advantage of the present invention is that ceramic products with adequate green strength can be produced by use of the inventive reactive liquid ceramic binder at temperatures <30° C., preferably at room temperature.

It is advantageous that through the use of the ceramic binder according to the invention, the firing temperature and/or the firing time and hence the energy consumption in the production of ceramic products, in particular refractory products, can be decreased. In addition, with the use of fossil energy sources, $CO_2$ and $NO_x$ emission can be reduced on account of the lower energy consumption.

It has also been observed that the firing times can be shortened, at least in most cases, without this being disadvantageous with regard to the material properties, in particular the strength, of the ceramic products produced using the inventive ceramic binder compared to conventional refractory ceramic products, i.e., those produced according to the state of the art.

Furthermore, it has advantageously been observed that on use of the reactive liquid ceramic binder according to the invention in the temperature range between, for example, 100° C. and 1000° C., preferably 200° C. and 800° C., there is no decrease, or only a slight decrease, in the material strength, i.e., the cold crushing strength.

The use of the reactive liquid ceramic binder according to the invention can result in no formation or no significant formation of low-melting phases in the ceramic during the production process. This is advantageous, since the occurrence of such phases is disadvantageous for the material properties, in particular with regard to their stability at high temperatures.

Yet another advantage of the reactive liquid ceramic binder of the instant invention is that with or without the addition of water it imparts high dimensional stability to the ceramic product, and is therefore preferably also usable for ceramic products susceptible to hydration, for example basic refractories.

In the meaning of this invention, ceramic products also include dried, annealed and/or fired ceramic products. The term ceramic product, as used in the present description, also includes so-called green bodies. In particular, the term ceramic product includes heat-resistant and/or refractory ceramic products (refractories). Furthermore, a ceramic product is also understood to mean products such as molded objects and materials wherein a so-called composite material is involved, i.e., which are made up of a ceramic material and at least one other material or other phase. This can also be present as at least one ceramic layer, preferably a ceramic surface coating.

By means of the reactive liquid ceramic binder according to the invention, shaped and unshaped ceramic products, in particular heat-resistant and/or refractory, unfired and/or fired ceramic shaped objects, unshaped refractory products, for example concretes, ramming mixes, casting mixes, coatings or coverings with excellent physical and mechanical properties and improved production parameters can be obtained.

According to the invention, production parameters should be understood to mean in particular the parameters for the production of the unshaped products, the unfired products, the green bodies, and the fired ceramic products.

The reactive liquid ceramic binder according to the invention can be added to the ceramic powder in a weight proportion of 0.01 wt. % to 70 wt. %, preferably from 0.1 wt. % to 50 wt. % and even more preferably from 0.5 wt. % to 30 wt. % based on the total weight of the ceramic powder.

It has surprisingly been found that the reactive liquid ceramic binder is effective in markedly lower proportions, based on the ceramic powder, than the compounds known from the state of the art. Marked effects can be achieved with proportions of the organo-modified siloxane compounds of less than 5 wt. %, based on the total weight of the ceramic powder. According to the invention, proportions of the organo-modified siloxane compounds in the range from 0.05 wt. % to <10 wt. %, in particular 0.1 wt. % to 5 wt. %, particularly preferably 0.5 wt. % to 3 wt. %, each based on the quantity of ceramic powder, are preferred.

If the proportion of the organo-modified siloxane compounds added is below 0.01 wt. %, it is very difficult to obtain a fired product of high strength, while with the addition of more than 10 wt. %, in particular more than 15 wt. % of the organo-modified siloxane compounds, swelling of the fired product can be observed, as a result of which its strength and density can be adversely affected.

According to the invention, the reactive liquid ceramic binder can be used for the production of ceramic products, in particular of shaped and unshaped, fired and unfired refractory, ceramic products, from ceramic powder/s.

A further object of the present invention relates to a ceramic mixture which contains ceramic binder according to the invention and ceramic powder.

The ceramic mixtures can be used directly, or firstly be processed into powders or granulates.

Surprisingly, it has also been found that ceramic mixes containing the liquid organo-modified siloxane compounds can be processed at temperatures below the softening point of solid, organo-modified siloxane compounds.

According to the invention, it can therefore be preferable to process ceramics containing ceramic powder and ceramic binder merely under pressure.

The ceramic mixes according to the invention can be used for the production of shaped and unshaped ceramic products, and for the production of fired and also unfired ceramic products.

Preferably, ceramic powders usable for the production of the ceramic mixtures can be selected from the group comprising coarse-grained, medium-grained, fine-grained and/or ultrafine-grained ceramic particles. Suitable ceramic particles can include all typical, oxide, non-oxide, acidic or basic ceramic raw materials and mixtures thereof. Particularly preferred are $Al_2O_3$-based ceramic products. Mixtures of these raw materials can also be present.

Ceramic powders, in particular mixtures of ceramic powders and raw materials thereof particularly suitable for use, include:

Oxides, such as $BeO$, $MgO$, $Al_2O_3$, $SiO_2$, $CaO$, $TiO_2$, $Cr_2O_3$, $MnO$, $Fe_2O_3$, $ZnO$, $SrO$, $Y_2O_3$, $BaO$, $CeO_2$ and $UO_2$; and/or Carbides, such as $Be_2C$, $Be_4C$, $Al_4C_3$, $SiC$, $TiC$, $Cr_3C_2$, $Mn_3C$, $Fe_3C$, $SrC_2$, $YC_2$, $ZrC$, $NbC$, $Mo_2C$, $BaC_2$, $CeC_2$, $HfC$, $TaC$, $WC$ and $UC$; and/or Nitrides, such as $Be_3N_2$, $BN$, $Mg_3N_2$, $AlN$, $Si_3N_4$, $Ca_3N_2$, $TiN$, $VN$, $CrN$, $Mn_3N_2$, $Sr_3N_2$, $ZrN$, $NbN$, $Mo_3N_2$, $HfN$, $TaN$, $WN_2$ and $UN$; and/or Borides, such as $AlB_4$, $CaB_6$, $TiB_2$, $VB_2$, $CrB_2$, $MnB$, $FeB$, $CoB$, $NiB$, $SrB_6$, $YB_6$, $ZrB_2$, $NbB_2$, $MoB_2$, $BaB_6$, $LaB_6$, $CoB_6$, $HfB_2$, $TaB_2$, $WB$ and $UB_4$; and/or Silicides, such as $CaSi$, $Ti_5Si_3$, $V_5Si_3$, $CrSi_2$, $FeSi$, $CoSi$, $ZrSi_2$, $NbSi_2$, $MoSi_2$, $TaSi_2$ and $WSi_2$; and/or mixtures of the aforesaid ceramic substances.

Further ceramic particles which can be used include oxide and non-oxide compounds, mixed phases and the like, for example mullite ($Al_6Si_2O_{13}$), mixed crystals from the $Al_2O_3$—$Cr_2O_3$ system, $MgSiO_4$, $CaSiO_4$, $ZrSiO_4$, $MgAl_2O_4$, $CaZrO_3$, SIALON, ALON, and/or $B_4C$—$TiB_2$.

In addition, ceramic particles of non-stoichiometric composition such as $TiO_x$ silicates, glasses and ceramic materials with a metal phase can be used according to the invention.

Ceramic particles usable according to the invention can also include calcined aluminas, reactive aluminas, ultrafine-milled refractory raw materials such as microsilica, refractory clay and/or bond clay.

In the meaning of the present invention, coarse-grained is understood to mean granulations preferably ≥1 mm, particularly preferably 1 mm to 10 mm. In the meaning of the present invention, medium-grained is understood to mean granulations from ≥0.1 mm to ≤1 mm, preferably 0.2 mm to 0.5 mm.

In the meaning of the present invention, fine-grained is understood to mean granulations from 0.02 mm to ≤0.2 mm, particularly preferably 0.02 mm to 0.1 mm. This granulation fraction is commonly also referred to in technical language as flour.

Ultrafine granules is understood to mean in particular reactive refractory components with an average particle size ≤15 µm, preferably ≤5 µm.

For the attainment of good strength properties in the ceramic products according to the invention, the use of ceramic mixes containing the ceramic binder in combination with so-called functional additives such as oxide and/or non-oxide micropowders, nanopowders, metal powders, metal, ceramic, glass or plastic fibers and/or fabrics can be advantageous.

It is particularly preferable if the ceramic mixture contains nanoscale metal oxides, preferably nanoscale aluminum oxide.

For some process steps and/or applications, it has been found advantageous in some instances to use or to use in part grain sizes less than 1 µm, in other words to add nanoscale ceramic powders to the ceramic powder mixture.

The coarse-grained components can be present in the ceramic material in proportions ≤100 wt. %, preferably in proportions ≤90 wt. %, particularly preferably in proportions from 15 wt. % to 80 wt. %, based on the total weight of the ceramic mixture.

The medium-grained components can be present in the ceramic mix in proportions ≤100 wt. %, preferably in proportions ≤40 wt. %, particularly preferably in proportions from 3 wt. % to 20 wt. %, based on the total weight of the ceramic mix.

The fine-grained components can be present in the ceramic mix in proportions ≤100 wt. %, preferably in proportions ≤95 wt. %, particularly preferably in proportions from 5 wt. % to 80 wt. %, based on the total weight of the ceramic mix.

The ultrafine-grained components can be present in the ceramic mix in proportions ≤100 wt. %, preferably in proportions ≤50 wt. %, particularly preferably in proportions from 0.1 wt. % to 35 wt. %, based on the total weight of the ceramic mix.

The term "total weight of the ceramic mix" as used above relates to the ceramic mix without binder.

Furthermore, it is preferable that the ceramic mix be free-flowing. The ceramic mix can have a powder density of 500 g/l to 2000 g/l, preferably from 600 g/l to 1800 g/l, more preferably from 700 g/l to 1600 g/l, preferably from 800 g/l to 1500 g/l and particularly preferably from 850 g/l to 1200 g/l.

Furthermore, additives, additive substances and/or binders, selected from the group comprising organic binders, inorganic binders, water and the like can be added to the ceramic mix.

The ceramic mix according to the invention can be in the form of a spray molding mix, ramming mix, molding mix, painting mix or coating mix.

The ceramic powder can contain grain sizes in the nano range and can preferably consist of oxides, carbides, nitrides, borides and/or silicides, preferably oxides of aluminum.

The ceramic mix obtained can be used directly for the process according to the invention, however it can also be calcined in air, under vacuum or in an atmosphere of inert gas, carbon monoxide, carbon dioxide, nitrogen and/or hydrocarbons and the calcined molding mix pulverized and used as a ceramic, preferably nanoscale, powder.

Particularly preferably are ceramic mixes which contain ceramic powders such as magnesium silicates, aluminum silicates, spinels, silicon dioxide, magnesium oxide, calcium oxide, chromium oxide, aluminum oxide, zirconium oxide, zinc oxide, zirconium silicate, silicon carbide, SIALON, ALON, silicon nitride and/or mixtures thereof.

The ceramic mixes can also contain catalysts, normal additive substances, binders and/or additives. The ceramic mixes can also contain small quantities of mold release agents, stabilizers and/or pigments.

Furthermore, the use of ceramic mixes containing the ceramic binder in combination with hydraulic binders such as alumina cement or Portland cement, optionally with water in variable quantities, can likewise be advantageous.

A further object of the present invention relates to a process for the production of ceramic products, in particular of refractories.

The process according to the invention for the production of molded ceramic products can quite generally be divided into two embodiments.

In the first embodiment, the molding mix, which is a mixture of the ceramic powder and the binder according to the invention, is firstly compressed under a compression pressure of >1 MPa, preferably between ≥100 MPa and ≤200 MPa, in order to produce a molded blank or green body of a defined external shape. The pressing can be effected by means of conventional technologies, for example uniaxially, isostatically or the like. The resulting ceramic body can be fed into the application without a further heat treatment or can be subjected to a subsequent firing, whereby a ceramic product, preferably a refractory ceramic product, is obtained.

According to the second embodiment, the mixture of the ceramic powder and the reactive liquid binder according to the invention is simultaneously molded and heated and/or fired (so-called hot pressing process). In this embodiment of the present invention, the mixture is compressed under a compression pressure of >1 MPa, preferably 5 MPa to 100 MPa, at a higher temperature than room temperature, preferably >50° C. The pressing can be effected by means of conventional technologies, for example uniaxially, isostatically or the like. The resulting ceramic body can be fed into the application without a further heat treatment or can be subjected to a subsequent firing, whereby a ceramic product, preferably a refractory ceramic product, is obtained.

A suitable process for the production of shaped ceramic products, in particular shaped refractory ceramic products, comprises the following steps:
a) mixing of a reactive liquid ceramic binder according to the invention with ceramic powder so as to create a molding mix, and
b) consolidation of the molding mix obtained from step a) by means of pressure treatment and/or heat treatment, whereby a dimensionally stable ceramic product is obtained.

A further process for the production of unshaped ceramic products, in particular refractory ceramic products, comprises the following steps:
a) mixing of a ceramic binder according to the invention with ceramic powder;
b) optionally addition of additives, auxiliary agents and/or additive substances and/or other binders; and
c) creation of a ceramic compound, such as a concrete compound, molding mix, tamping mix or ramming mix.

The reactive liquid ceramic binder, in particular the liquid organo-modified siloxane compound, can be contained in the molding mix or ceramic mix in a weight proportion of 0.01 wt. % to 70 wt. %, preferably from 0.1 wt. % to 50 wt. % and preferably from 0.5 wt. % to 30 wt. %, based on the total weight of the ceramic powder.

To produce composite materials, the mixture obtained from step a) of the process can be applied onto a dimensionally stable support. Next the ceramic mix can be dried and/or annealed and/or fired. The thermal stability and/or size of the support material is inter alia decisive as to whether the composite material is only dried or exposed to further heat treatment steps such as annealing and/or firing.

As described above, an additive substance and/or binder can be added to the ceramic powder in a weight proportion from 0.01 wt. % to 50 wt. %, preferably from 0.05 wt. % to 30 wt. % and preferably from 0.1 wt. % to 20 wt. % based on the total weight of the ceramic powder.

Preferably the green body obtained from step b) can be consolidated by drying the green body at a temperature of ≥25° C. to <200° C.; and/or annealing at a temperature of ≤200° C. to <1000° C.; and/or firing at a temperature of ≥1000° C.

In the production of refractory products it can be important that the ceramic binder containing liquid organo-modified siloxane compounds used according to the invention reacts with other components of the ceramic mix, preferably of the refractory ceramic mix during the heat treatment, with the formation of refractory compounds.

In refractory ceramic mixes which produce no strength or only inadequate strength with the added liquid organo-modified siloxane compounds, an adequate binding strength can be attained by addition of an active ceramic powder. Particularly suitable for such a purpose is aluminum oxide. Also suitable are Al-containing substances which form a reactive aluminum oxide after a conversion process, for example, oxidation.

The reaction responsible for the bonding between ceramic powder and the organo-modified siloxane compounds of the reactive liquid ceramic binder according to the invention can take place at room temperature. With increasing temperature, the bonding strengthens further. After a heat treatment in the medium temperature range, from 400° C. to 1000° C. or to some extent even from 200° C. to 600° C., the ceramic products, in particular ceramic refractory materials, can reach high strengths, as a result of which a high temperature firing of >1000° C. is not necessary.

The strength of the dried and/or annealed and/or fired molded object can be further increased by impregnating it at least once with:

organo-modified siloxane compounds of the reactive liquid ceramic binder according to the invention, in particular with liquid, organo-modified siloxane compounds; and/or a liquid polymeric organosilicon compound; and/or with a solution of a solid polymeric organosilicon compound in a solvent; and/or with a melt of a solid polymeric organosilicon compound;

at room temperature and/or with heating and heated to a temperature of ≥200° C. in air, under vacuum and/or in an atmosphere of inert gas, hydrogen, carbon monoxide, carbon dioxide, nitrogen and/or hydrocarbons, after the impregnation level has if necessary been raised by increasing the pressure.

The addition of a solvent to the ceramic binder resin to decrease the viscosity can favor the impregnation process.

A molded blank is understood to mean a usable green body, which has sufficient initial strength for it to be capable of being handled or mechanically processed in further process steps.

In addition, green bodies can be cured before the sintering in order to obtain still stronger green bodies. The curing can be effected by:

ageing in a moist atmosphere, and/or heating to a temperature ≥30° C., and/or addition of suitable condensation catalysts, known per se, such as dibutyltin dilaurate or tetrabutyl titanate.

Through the use of the ceramic binder according to the invention, in particular ceramic binder wherein the reactive liquid ceramic binder contains liquid organo-modified siloxane compounds, an adequately high green strength can be attained. The high dimensional stability or cold crushing strength makes it possible for the green bodies to be further processed or molded before the final annealing or firing process, without this resulting in destruction of the green bodies owing to mechanical stress.

The green bodies can be molded by normal processes known in the state of the art. The molded green bodies can, if desired, be further shaped by mechanical processing.

The firing of the molded bodies or of the ceramic products can be continued until no further weight loss is observed. The duration of the firing process varies depending on the temperature, the composition of the molding mix and the proportion of the siloxanes used according to the invention in the molding mix.

Constant weight is normally reached after 1 to 24 hours at temperatures >400° C.

Surprisingly it has now been found that with the use of the ceramic binder according to the invention, in particular ceramic binder wherein the reactive liquid ceramic binder preferably contains liquid organo-modified siloxane compounds, and of molding mixes according to the invention containing the reactive liquid ceramic binder, a firing of fracture-free ceramic products with outstanding physical and mechanical properties can be achieved:

in a shorter time relatively at the same firing temperatures; and/or at relatively low firing temperatures in comparable times.

The production of shaped ceramic products, such as refractory bricks, can comprise the following steps:

production of a homogenous ceramic mix, in particular molding mix, from refractory ceramic particles and ceramic binder;

optionally addition of a reactive aluminum oxide or of an Al-containing substance;

optionally addition of water or another binder and homogenization of the ceramic mixture or molding mix;

optionally addition of additives and further homogenization of the mixture or molding mix;

optionally, additives which perform specific functions in the finished bricks are mixed into the mixture. Suitable additives are for example metal powders which improve the oxidation stability of a non-oxide ceramic product, in particular of a ceramic refractory material;

pressing of the homogenous refractory molding mix into defined brick shapes. Compression pressures ≤100 MPa and ≤200 MPa are preferred;

drying and/or annealing of the pressed bricks at temperatures >50° C.; and/or firing of the dried and annealed bricks at temperatures ≥400° C.

The production of the unshaped refractory products according to the invention can be performed at the refractory producer's works or on site at the refractory user's works, preferably in the following steps:

production of a homogenous ceramic mix;

optionally addition of an active aluminum oxide or of an Al-containing substance;

optionally addition of a binder, additives and/or water and homogenization of the mechanical mixture;

optionally addition of additive substances and further homogenization of the mechanical mixture.

As required, additives which perform specific functions in the finished molding mixes are mixed into this mixture. Examples of additive substances are metal powders and non-oxide materials such as carbon, carbides, nitrides, silicides, metal fibers, plastic fibers or carbon fibers, which further improve the oxidation resistance, strength, drying behavior, corrosion resistance and/or the temperature change resistance of the ceramic product.

Ceramic mixes, in particular homogenous ceramic mixes, can be processed into a ceramic product, including refractory materials, monolithic refractory linings etc. by means of techniques common in refractory technology, such as pressing, casting, vibration, spraying, concrete spraying, ramming and the like.

From the molding mixes according to the invention, such as refractory molding mixes, prefabricated products can be produced. For this the molding mixes produced as described above are introduced into a metal or wood or plastic mold. By subsequent vibration, ramming, compression and the like, the mix can be further compacted. After curing of the mix, the prefabricated product is released from the mold and dried and/or annealed at 30° C. to 200° C. As required, the dried or annealed prefabricated product can be fired. The firing conditions essentially depend on the chemical and mineralogical composition of the refractory mix and on the shape and geometry of the product. As a rule, a firing at temperatures ≤1600° C. is sufficient. After drying, annealing and/or firing, the ceramic prefabricated product according to the invention, in particular refractory materials, are ready for use.

The degree of curing depends on the shape of the ceramic product. In any case, the ceramic molded body is cured until it has the strength necessary for avoidance of a shape change during the firing process.

The shaped and unshaped ceramic products according to the invention, such as refractory materials can be used in the furnaces and plants of the nonferrous metal industry, steel industry, cement industry, glass industry, waste incineration industry and the like.

Although the organo-modified siloxanes according to the invention of the ceramic binder are preferably suitable as binders for ceramic mixes, their use is not so limiting. For example, the organ-modified siloxanes can also be used in casting and pressing compounds, in coating mixes for electrical insulators and in protective coating mixes for metal surfaces.

A further object of the present invention relates to the ceramic product, in particular dimensionally stable ceramic product, itself.

It has been found according to the invention that through the use of the binder products made of ceramic powder that are dimensionally stable can be obtained at room temperature or temperatures of <30° C. and process times of several hours or days. Such ceramic products can possess good cold crushing strength.

Particularly preferred ceramic products are refractory ceramic products.

The ceramic product can be shaped or unshaped.

According to the invention, dimensionally stable ceramic products manufactured under a compression pressure of 100 MPa can have a cold crushing strength of ≥15 MPa after a heat treatment at 100° C. to ≤1000° C., preferably ≤700° C. for 2 hours.

The production and the properties of the products according to the invention will be illustrated below on the basis of some examples which follow herein below.

The liquid, organo-modified siloxane compounds A to D of the binder according to the invention were produced according to the state of the art, as described for example in DE-A1 33 12 911, EP-A1-0 124 748 and in Noll, Chemie und Technologie der Silicone [Chemistry and Technology of the Silicones] (1968), Verlag Chemie. The symbols in the following table relate to those described above for formula (I).

| Compound | a | b | $R^1$ | $R^2$ |
|---|---|---|---|---|
| A | 1.0 | 0.9 | methyl | ethyl |
| B | 1.0 | 0.4 | methyl | ethyl |
| C | 1.0 | 1.2 | methyl | ethyl |
| D | 1.9 | 0.1 | methyl | ethyl |

Example 1

Binding Strength in Corundum Bricks

A high purity sintered alumina, T60 obtainable from the firm ALMATIS GmbH in Ludwigshafen, with the following grain size composition:

| Coarse-grained | 1-2 mm | 50 wt. % |
|---|---|---|
| Medium-grained | 0.2-0.5 mm | 10 wt. % |
| Flour | <0.1 mm | 40 wt. % | was homogenously mixed with 4 wt. parts of compound A. For comparison, a molding mix was produced with 4 wt. parts of sulfite liquor (without compound A). Test pieces were made from the mixtures under a compression pressure of 100 MPa and then fired at 600° C. and 1500° C. for 2 hrs. After firing, the test pieces had the following characteristics:

|  | With compound A | | Without compound A | |
|---|---|---|---|---|
|  | 600° C. | 1500° C. | 600° C. | 1500° C. |
| Cold crushing strength (MPa) (as per DIN EN 993-1) | >50 | >100 | <5 | <25 |

The differences in the development of the cold crushing strength depending on the firing temperature in samples with and without compound A are shown in FIG. 1.

The addition of compound A causes an enormous rise in the strength of the ceramics.

Example 2

Binding Strength of Different Compounds

A high purity sintered alumina, T60 obtainable from the firm ALMATIS GmbH in Ludwigshafen, with the following grain size composition:

| Coarse-grained | 1-2 mm | 50 wt. % |
|---|---|---|
| Medium-grained | 0.2-0.5 mm | 10 wt. % |
| Flour | <0.1 mm | 40 wt. % | was homogenously mixed with 4 wt. parts of compound A, B, C and D respectively. Test pieces were made from the mixtures under a compression pressure of 100 MPa and then fired at 600° C. for 2 hrs. After firing, the test pieces had the following characteristics:

|  | Compound | | | |
| --- | --- | --- | --- | --- |
|  | A | B | C | D |
| Cold crushing strength (MPa) (as per DIN EN 993-1) | >50 | >80 | >60 | >10 |

The addition of compounds A, B and C causes a large increase in the strength of the corundum bricks. The compound D develops an increased binding strength or strength of the corundum bricks after firing at 600° C.

Example 3

Binding Strength of an Aqueous Emulsion

A high purity sintered alumina, T60 obtainable from the firm ALMATIS GmbH in Ludwigshafen, with the following grain size composition:

| Coarse-grained | 1-2 mm | 50 wt. % |
| --- | --- | --- |
| Medium-grained | 0.2-0.5 mm | 10 wt. % |
| Flour | <0.1 mm | 40 wt. % | was homogenously mixed with 5 wt. parts of a 50% aqueous emulsion of compound B. For comparison, a molding mix was produced with 4 wt. parts of sulfite liquor (without compound B). Test pieces were made from the mixtures under a compression pressure of 100 MPa and then fired at 600° C. and 1400° C. for 2 hrs. After firing, the test pieces had the following characteristics:

|  | With emulsion of compound B | | Without compound B | |
| --- | --- | --- | --- | --- |
|  | 600° C. | 1400° C. | 600° C. | 1400° C. |
| Cold crushing strength (MPa) (as per DIN EN 993-1) | >10 | >25 | <5 | <20 |

The aqueous emulsion of compound B is suitable as a binder for corundum bricks.

Example 4

Effect of Firing Time on Binding Strength in Corundum Bricks

A high purity sintered alumina, T60 obtainable from the firm ALMATIS GmbH in Ludwigshafen, with the following grain size composition:

| Coarse-grained | 1-2 mm | 50 wt. % |
| --- | --- | --- |
| Medium-grained | 0.2-0.5 mm | 10 wt. % |
| Flour | <0.1 mm | 40 wt. % | was homogenously mixed with 4 wt. parts of compound B. Test pieces were made from the mixtures under a compression pressure of 100 MPa and then fired at 1200° C. for 2, 6 and 10 hrs. After firing, the test pieces had the following characteristics:

|  | Firing time at 1200° C. | | |
| --- | --- | --- | --- |
|  | 2 hrs | 6 hrs | 10 hrs |
| Cold crushing strength (MPa) (as per DIN EN 993-1) | >90 | >100 | >100 |

The duration of the firing process has no significant effect on the strength of the corundum materials with addition of compound B.

Example 5

Effect of Compound B as Function of Concentration

A high purity sintered alumina, T60 obtainable from the firm ALMATIS GmbH in Ludwigshafen, with the following grain size composition:

| Coarse-grained | 1-2 mm | 50 wt. % |
| --- | --- | --- |
| Medium-grained | 0.2-0.5 mm | 10 wt. % |
| Flour | <0.1 mm | 40 wt. % | was homogenously mixed with 2, 4 and 10 wt. parts of compound B. Test pieces were made from the mixtures under a compression pressure of 100 MPa and then fired at 600° C. for 2 hrs. After firing, the test pieces had the following characteristics:

|  | 2% Compound B | 4% Compound B | 10% Compound B |
| --- | --- | --- | --- |
| Cold crushing strength (MPa) (as per DIN EN 993-5) | >40 | >60 | >50 |

Example 6

Improvement in Binding Strength by Addition of an Active $Al_2O_3$

A high purity SiC raw material, SiC dunkel/dark, obtainable from the firm ESK—SiC GmbH in Frechen, with the following grain size composition:

| Coarse-grained | 1-2 mm | 50 wt. % |
| --- | --- | --- |
| Flour | <0.06 mm | 50 wt. % | was homogenously mixed with 4 wt. parts of compound A. For comparison, a mixture was also produced with 10 wt. parts of Micro-$Al_2O_3$ powder, calcined alumina CTC 50, obtainable from the firm ALMATIS in Ludwigshafen, without compound A. Test pieces were made from the mixtures under a compression pressure of 100 MPa and then fired at 600° C. and 1500° C. for 2 hrs. After firing, the test pieces had the following characteristics:

|  | Without aluminum oxide | | With aluminum oxide | |
| --- | --- | --- | --- | --- |
|  | 600° C. | 1500° C. | 600° C. | 1500° C. |
| Cold crushing strength (MPa) (DIN EN 993-5) | >20 | >70 | >40 | >120 |

The addition of a reactive aluminum oxide contributes to a considerable increase in the material strength.

Example 7

Binding Strength in Magnesia Bricks

A high purity MgO sinter, NEDMAG, obtainable from the firm NedMag Industries B.V. in Veendam, Netherlands, with the following grain size composition:

| Coarse-grained | 1-2 mm | 50 wt. % |
| --- | --- | --- |
| Medium-grained | 0.2-0.5 mm | 10 wt. % |
| Flour | <0.1 mm | 40 wt. % | was homogenously mixed with 4 wt. parts of compound A. For comparison, a molding mix was produced with 4 wt. parts of sulfite liquor without compound A. Test pieces were made from the mixtures under a compression pressure of 100 MPa and then fired at 600° C. and 1500° C. for 2 hrs. After firing, the test pieces had the following characteristics:

|  | With compound A | | Without compound A | |
| --- | --- | --- | --- | --- |
|  | 600° C. | 1500° C. | 600° C. | 1500° C. |
| Cold crushing strength (MPa) (DIN EN 993-5) | >35 | >40 | <5 | <25 |

The addition of compound A also causes a considerable increase in strength in basic MgO bricks.

Example 8

Binding Strength in Corundum Bricks Containing Graphite

A high purity sintered alumina, T60, obtainable from the firm ALMATIS GmbH in Ludwigshafen, with the following grain size composition:

| Coarse-grained | 1-2 mm | 50 wt. % |
| --- | --- | --- |
| Flour | <0.1 mm | 40 wt. % |
| Graphite, flakes | <0.2 mm | 10 wt. % | was homogenously mixed with 4 wt. parts of compound B. For comparison, a molding mix was produced with 4 wt. parts of sulfite liquor without compound B. Test pieces were made from the mixtures under a compression pressure of 100 MPa and then fired in air at 600° C. and 1500° C. for 2 hrs. After firing, some of the test pieces were cut through in the middle.

The size of the black core (unoxidised graphite) relative to the whole cross-section area served as a measure of the oxidation stability.

After the firing, the test pieces had the following characteristics:

|  | With compound B | | Without compound B | |
| --- | --- | --- | --- | --- |
|  | 600° C. | 1500° C. | 600° C. | 1500° C. |
| Cold crushing strength (MPa) | >15 | >30 | <3 | <5 |
| Unoxidised graphite (%) | ≈100 | <15 | ≈100 | ≈0 |

The addition of compound B also imparts considerable strength to the carbon-containing corundum bricks. In addition, the tests showed that compound B improves the oxidation resistance of the carbon.

Example 9

Binder for Alumina Castable

Mixtures with the following grain size composition were prepared:

| Sintered alumina, T60, coarse-grained | 1-2 mm | 35 wt. % |
| --- | --- | --- |
| Sintered alumina, T60, fine-grained | <45 μm | 35 wt. % |
| Calcined alumina, CTC 50, | <15 μm | 30 wt. % |

All raw materials are obtainable from the ALMATIS GmbH in Ludwigshafen. 1.5 wt. parts of compound A and 12 wt. parts of water were added to the mixture. After homogenization, a self-flowing alumina castable was formed. Test pieces from the mixture were cast in a plastic mold and dried for 24 hrs at 80° C. The test pieces were then fired at 600, 800, 1000 and 1500° C., for 2 hrs.

After firing, the test pieces had the following characteristics:

|  | 600° C. | 1000° C. | 1200° C. | 1500° C. |
| --- | --- | --- | --- | --- |
| Cold crushing strength (MPa) (DIN EN 993-5) | >80 | >80 | >140 | >220 |

The alumina castable with a relatively small addition of compound A was characterized by high strength.

Example 10

Alumina Ramming Mix

Mixtures with the following grain size composition were prepared:

| Sintered alumina, T60, coarse-grained | 1-2 mm | 50 wt. % |
| --- | --- | --- |
| Sintered alumina, medium-grained | 0.2-0.5 mm | 10 wt. % |
| Sintered alumina, T60, flour |  | 40 wt. % |

All the raw materials are obtainable from the ALMATIS GmbH in Ludwigshafen. 5 wt. parts of compound C were added to the mixtures. After homogenization, the molding mix was compacted in a steel mold by impacts. Test pieces thus produced were then fired at 600° C. and 1500° C. for 2 hrs. After firing, the test pieces had the following characteristics:

|  | 600° C. | 1500° C. |
| --- | --- | --- |
| Cold crushing strength (MPa) (DIN EN 1402-6) | >50 | >70 |

Compound C was also very suitable as a water-free binder resin for the production of ramming mixes.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed as new is:

1. A ceramic mix comprising ceramic particles and at least one organo-modified siloxane compound which is a liquid at 25° C., said at least one organo-modified siloxane compound binds said ceramic particles together forming said ceramic mix and has organoalkoxy-siloxane units according to general formula (I)

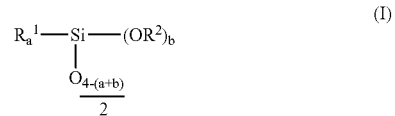
(I)

wherein
$R^1$=an alkyl radical having from 1 to 4 carbon atoms,
$R^2$=an alkyl radical with 1 to 4 carbon atoms,
$a \geq 0$ and $\leq 2$, and
$b > 0$ and $\leq 3$,
with the proviso that $a+b \geq 1$ and $<4$, and $R^2$ is not H.

2. The ceramic mix as claimed in claim 1, further including nanoscale metal oxides.

3. The ceramic mix as claimed in claim 1, wherein the ceramic mix has a powder density of 500 g/l to 2000 g/l.

4. The ceramic mix as claimed in claim 1, further including at least one additive, said at least one additive is selected from an organic binder, an inorganic binder or mixtures thereof.

5. The ceramic mix of claim 1 wherein no water is added to the ceramic mix.

6. A ceramic mix comprising ceramic particles and at least one organo-modified siloxane compound which is a liquid at 25° C., said at least one organo-modified siloxane compound binds said ceramic particles together forming said ceramic mix and has organoalkoxy-siloxane units according to general formula (I)

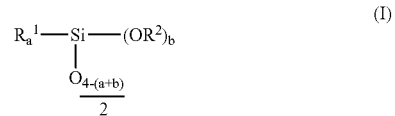
(I)

wherein
$R^1$=methyl or ethyl,
$R^2$=an alkyl radical with 1 to 4 carbon atoms or a mixture thereof,
$a \geq 0$ and $\leq 2$, and
$b > 0$ and $\leq 3$,
with the proviso that $a+b \geq 1$ and $<4$, and $R^2$ is not H.

7. The ceramic mix of claim 6 wherein no water is added to the ceramic mix.

* * * * *